(12) United States Patent
Miller

(10) Patent No.: US 7,243,804 B2
(45) Date of Patent: Jul. 17, 2007

(54) METHOD AND APPARATUS FOR SUPPORTING TOOLS IN A DOOR JAMB

(76) Inventor: Rodney B. Miller, P.O. Box 134, Middlebourne, WV (US) 26149

( * ) Notice: Subject to any disclaimer, the term of this patent is extended or adjusted under 35 U.S.C. 154(b) by 187 days.

(21) Appl. No.: 10/945,072

(22) Filed: Sep. 20, 2004

(65) Prior Publication Data

US 2005/0253030 A1  Nov. 17, 2005

Related U.S. Application Data

(60) Provisional application No. 60/504,517, filed on Sep. 18, 2003.

(51) Int. Cl.
*A47F 7/00* (2006.01)
*A47B 23/00* (2006.01)

(52) U.S. Cl. ..................... 211/17; 248/112.1
(58) Field of Classification Search ............. None
See application file for complete search history.

(56) References Cited

U.S. PATENT DOCUMENTS

| | | | |
|---|---|---|---|
| 438,280 A | 10/1890 | Wright | |
| 914,047 A | 3/1909 | Holcomb | |
| 1,069,000 A | 7/1913 | Giles | |
| 2,183,074 A * | 12/1939 | Hopkins | 248/37.6 |
| 3,989,398 A | 11/1976 | Wendt | |
| 5,407,414 A | 4/1995 | Bass | |
| 5,800,323 A | 9/1998 | Ansel | |
| 5,842,581 A * | 12/1998 | Graefe | 211/17 |
| 6,748,874 B2 * | 6/2004 | Gawronski | 108/42 |
| 2003/0168560 A1 | 9/2003 | Chipka | |

* cited by examiner

*Primary Examiner*—Robert Olszewski
*Assistant Examiner*—Dat Nguyen
(74) *Attorney, Agent, or Firm*—Pandiscio & Pandiscio

(57) ABSTRACT

An apparatus and system for supporting tools at a given height on a door jamb. The apparatus for use as a tool platform for working on stilts. The apparatus comprising a vertical support member, a fastener device extending from the doorjamb, and a wall grip mechanism. The wall grip mechanism comprising a first projection and a second projection disposed apart from one another at a first given width, and each one of the first projection and the second projection extending in a first direction away from the vertical support member. The apparatus further comprising a tool platform having a front end and a back end in opposition to one another, the tool platform forming a horizontal surface.

31 Claims, 24 Drawing Sheets

METHOD AND APPARATUS FOR SUPPORTING TOOLS IN A DOOR JAMB

REFERENCE TO PENDING PRIOR PATENT APPLICATION

This patent application claims benefit of pending prior U.S. Provisional Patent Application Ser. No. 60/504,517, filed Sep. 18, 2003 by Rodney B. Miller for STILT-MATE, which patent application is hereby incorporated herein by reference.

FIELD OF THE INVENTION

This invention is related to construction apparatus and methods in general, and more particularly to apparatus and methods for attaching a tool platform to a door jamb.

BACKGROUND OF THE INVENTION

The construction trades have lacked a suitable tool platform for working on stilts. Many persons who work on stilts in the drywall, painting, suspended ceiling and other construction trades rely upon stacked buckets, open windows, step ladders, or other various objects as a work platform on which to place tools while performing their job. Workers often have to travel through multiple rooms to access their tools. For example, buckets are stacked in one location of a job on which a worker places his tools and supplies. This type of a placement necessitates that the worker travel on stilts back and forth between work areas and the location of the stacked buckets to access tools and supplies. This travel is often over electrical cords, debris and around other workers to reach the tools and supplies. For drywall installation these tools may include, but are not limited to, a mud pan or tape.

Other common practices include placing tools upon open windows or on other unsecured locations. These practices are generally unwieldy and unsafe. The present invention eliminates these unsafe practices and reduces travel time on stilts which increases productivity by allowing a worker close and easy access to his tools.

SUMMARY OF THE INVENTION

An object of the invention is provide an apparatus for supporting tools at a given height in a door jamb.

Another object is to provide a system for supporting tools at a given height on a door jamb.

A further object is to provide a method for supporting tools at a given height on a door jamb.

A still further object is to provide apparatus for supporting tools at a given height on a door jamb, the apparatus having a handle for one handed attachment and detachment to and from a fastener device extending from the door jamb so as to allow a worker on stilts to reposition a tool platform carrying tools and accessories thereon throughout a job site.

With the above and other objects in view, as will hereinafter appear, there is provided apparatus for supporting tools at a given height on a door jamb, the apparatus comprising a vertical support member having a top end and a bottom end, a front side and a back side, and forming a passageway through the back side thereof, the passageway configured to attach the vertical support member to a fastener device extending from the door jamb, a wall grip mechanism in connection with the vertical support member, the wall grip mechanism disposed below the passageway formed in the vertical support member, the wall grip mechanism comprising a first projection and a second projection disposed apart from one another at a first given width, and each one of the first projection and the second projection extending in a first direction away from the vertical support member, the first direction parallel to a first axis extending from the front side to the back side of the vertical support member, and a tool platform extending in a second direction away from the vertical support member, the second direction parallel to a second axis extending from the back side to the front side of the vertical support member, the second direction substantially opposite to the first direction, the tool platform having a front end and a back end in opposition to one another, and the tool platform forming a horizontal surface between the front end and the back end, wherein the passageway of the vertical support member is positioned around the fastener device extending from a vertical face of the door jamb, the first projection of the wall grip mechanism is positioned on a first side of the door jamb and the second projection of the wall grip mechanism is positioned on a second side of the door jamb so as to fixedly position the tool platform to the door jamb at the given height.

In accordance with a further feature of the invention there is provided an apparatus for supporting tools at a given height on a door jamb, the apparatus comprising a vertical support member having a top end and a bottom end, a front side and a back side, and a clamping device configured to attach the vertical support member to the door jamb, the clamping device having a first grip arm and a second grip arm selectively positionable between a first position and a second position, the first position configured to dispose the first grip arm and the second grip arm at a first given width from one another, the first given width configured wider than the door jamb, and the second position configured to dispose the first grip arm and the second grip arm at a second given width from one another, the second given width configured substantially equal to the door jamb, and a wall grip mechanism in connection with the vertical support member, the wall grip mechanism disposed below the clamping device of the vertical support member, the wall grip mechanism comprising a first projection and a second projection disposed apart from one another at a first given width, and each one of the first projection and the second projection extending away from the vertical support member in a first direction away from the vertical support member, the first direction parallel to a first axis extending from the front side to the back side of the vertical support member, and a tool platform configured to extend in a second direction away from the vertical support member, the second direction parallel to a second axis extending from the back side to the front side of the vertical support member, the second direction configured substantially opposite to the first direction, the tool platform having a front end and a back end in opposition to one another, and the tool platform forming a horizontal surface between the front end and the back end, wherein the first grip arm and the second grip arm of the clamping device of the vertical support member are positioned against a first side and the second side of the door jamb, respectively, the first projection of the wall grip mechanism is positioned on the first side of the door jamb and the second projection of the wall grip mechanism is positioned on the second side of the door jamb so as to fixedly position the tool platform to the door jamb at the given height.

In accordance with a still further feature of the invention there is provided a system for supporting tools at a given height on a door jamb, the system comprising a fastening device having a given length and a given width, the fastening device configured to attach to a face of the door jamb, a vertical support member having a top end and a bottom end, a front side and a back side, and forming a passageway through the back side thereof, the passageway configured to attach the vertical support member to fastening device attached to the face of the door jamb, and a wall grip mechanism in connection with the vertical support member, the wall grip mechanism disposed below the passageway formed in the vertical support member, the wall grip mechanism comprising a first projection and a second projection disposed apart from one another at a first given width, and each one of the first projection and the second projection extending in a first direction away from the vertical support member, the first direction parallel to a first axis extending from the front side to the back side of the vertical support member, and a tool platform extending in a second direction away from the vertical support member, the second direction parallel to a second axis extending from the back side to the front side of the vertical support member, the second direction substantially opposite to the first direction, the tool platform having a front end and a back end in opposition to one another, and the tool platform forming a horizontal surface between the front end and the back end, wherein the passageway of the vertical support member is positioned around the fastening device extending from a vertical face of the door jamb, the first projection of the wall grip mechanism is positioned on a first side of the door jamb and the second projection of the wall grip mechanism is positioned on a second side of the door jamb so as to fixedly position the tool platform to the door jamb at the given height.

In accordance with another further feature of the present invention there is provided a method for supporting tools at a given height on a door jamb, the method comprising providing apparatus for supporting tools at a given height on a door jamb, the apparatus comprising a vertical support member having a top end and a bottom end, a front side and a back side, and forming a passageway through the back side thereof, the passageway configured to attach the vertical support member to a fastener device extending from the door jamb, and a wall grip mechanism in connection with the vertical support member, the wall grip mechanism disposed below the passageway formed in the vertical support member, the wall grip mechanism comprising a first projection and a second projection disposed apart from one another at a first given width, and each one of the first projection and the second projection extending in a first direction away from the vertical support member, the first direction parallel to a first axis extending from the front side to the back side of the vertical support member, and a tool platform extending in a second direction away from the vertical support member, the second direction parallel to a second axis extending from the back side to the front side of the vertical support member, the second direction substantially opposite to the first direction, the tool platform having a front end and a back end in opposition to one another, and the tool platform forming a horizontal surface between the front end and the back end, positioning the passageway of the vertical support member around the fastener device extending from the door jamb, positioning the first projection of the wall grip mechanism against a first side of the door jamb and the second projection of the wall grip mechanism against a second side of the door jamb so as to fixedly position the tool platform to the door jamb at the given height.

The above and other features of the invention, including various novel details of construction and combinations of parts and method steps will now be more particularly described with reference to the accompanying drawings and pointed out in the claims. It will be understood that the particular devices and method steps embodying the invention are shown by way of illustration only and not as limitations of the invention. The principles and features of this invention may be employed in various and numerous embodiments without departing from the scope of the invention.

BRIEF DESCRIPTION OF THE DRAWINGS

These and other objects and features of the present invention will be more fully disclosed or rendered obvious by the following detailed description of the preferred embodiments of the invention, which are to be considered together with the accompanying drawings wherein like numbers refer to like parts, and further wherein.

DETAILED DESCRIPTION OF THE PREFERRED EMBODIMENTS

Figure 1:
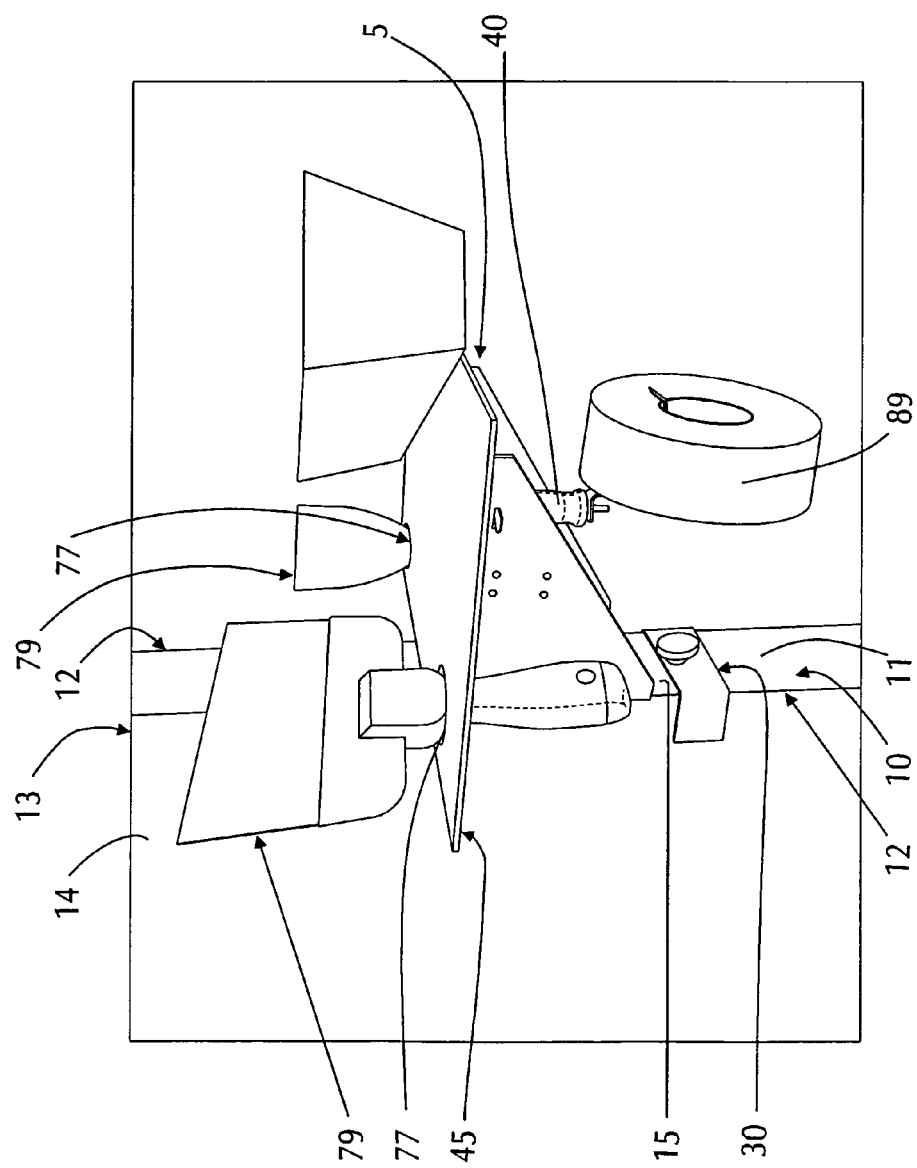
FIGS. 1-14 are various views of one form of a tool support device configured for attachment to a door jamb, illustrative of an embodiment of the invention.

Referring to FIGS. 1-8 and 10-14, and in a preferred embodiment of the present invention, there is shown a mobile, lightweight tool support device 5 configured for attachment to a door jamb 10. As related to the present invention, door jamb 10 comprises a face 11 and two side portions 12. Face 11 is generally formed by a wall stud 13 having a given width. Side portions 12 of door jamb 10 may include walls 14 extending away from face 11. Door jamb 10 encompasses various structures which include unfinished interior doorways within a building, and other similar structures having face 11 and two side portions 12. For example, these structures include, but are not limited to, the terminal end of a wall which extends into a room but does not form a doorway, or an opening through a wall which does not form a door frame.

Still referring to FIGS. 1-8 and 10-14, tool support device 5 is configured to allow a worker to move tools and supplies from room to room. Tool support device 5 of present invention preferably attaches to door jamb 10 with one of the two configurations disclosed hereinbelow. Either of the preferred embodiments are configured for single handed attachment so as to allow the worker to retain all tools and supplies while moving from one location to another location on a work site.

Figure 2:
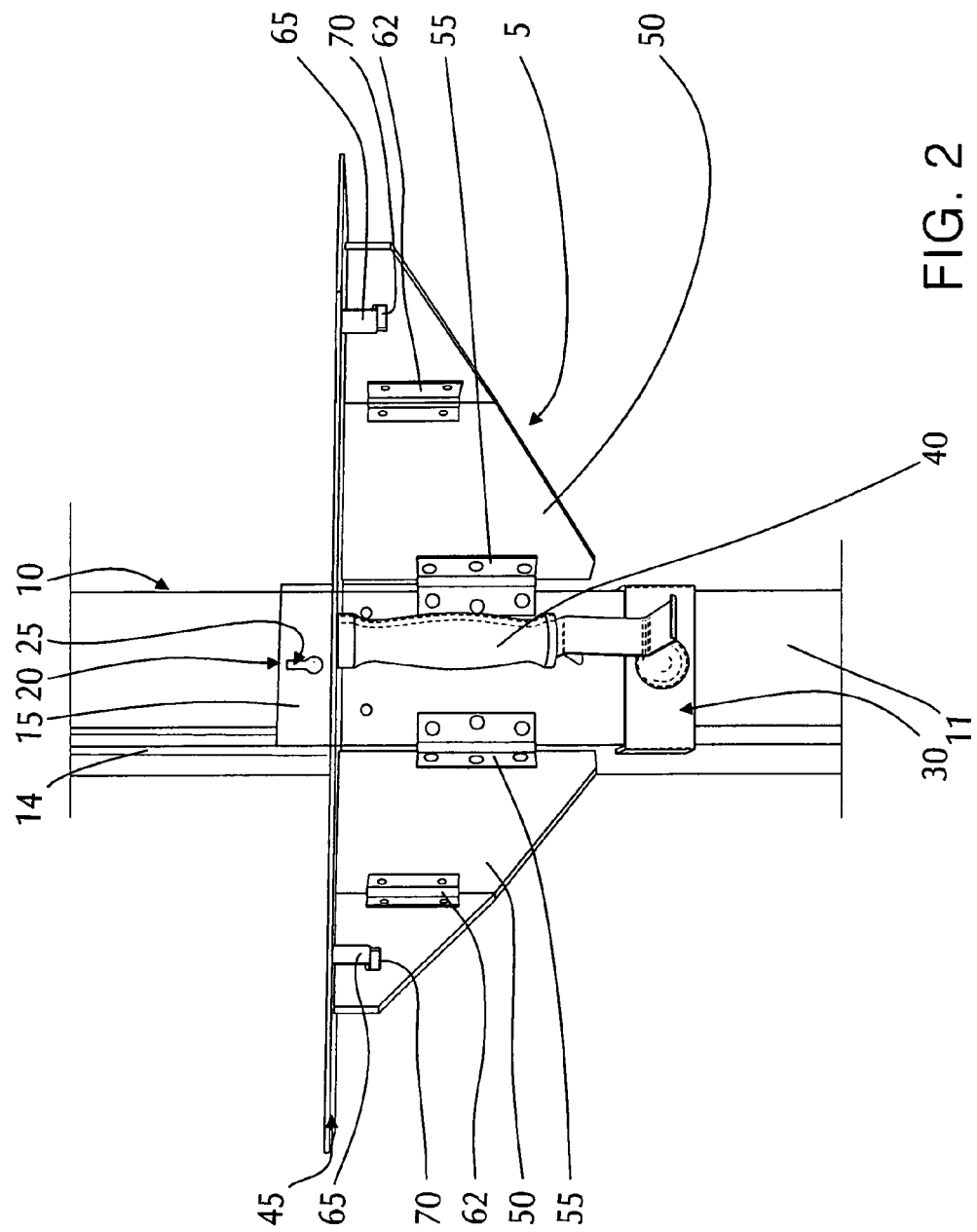
Figure 3:
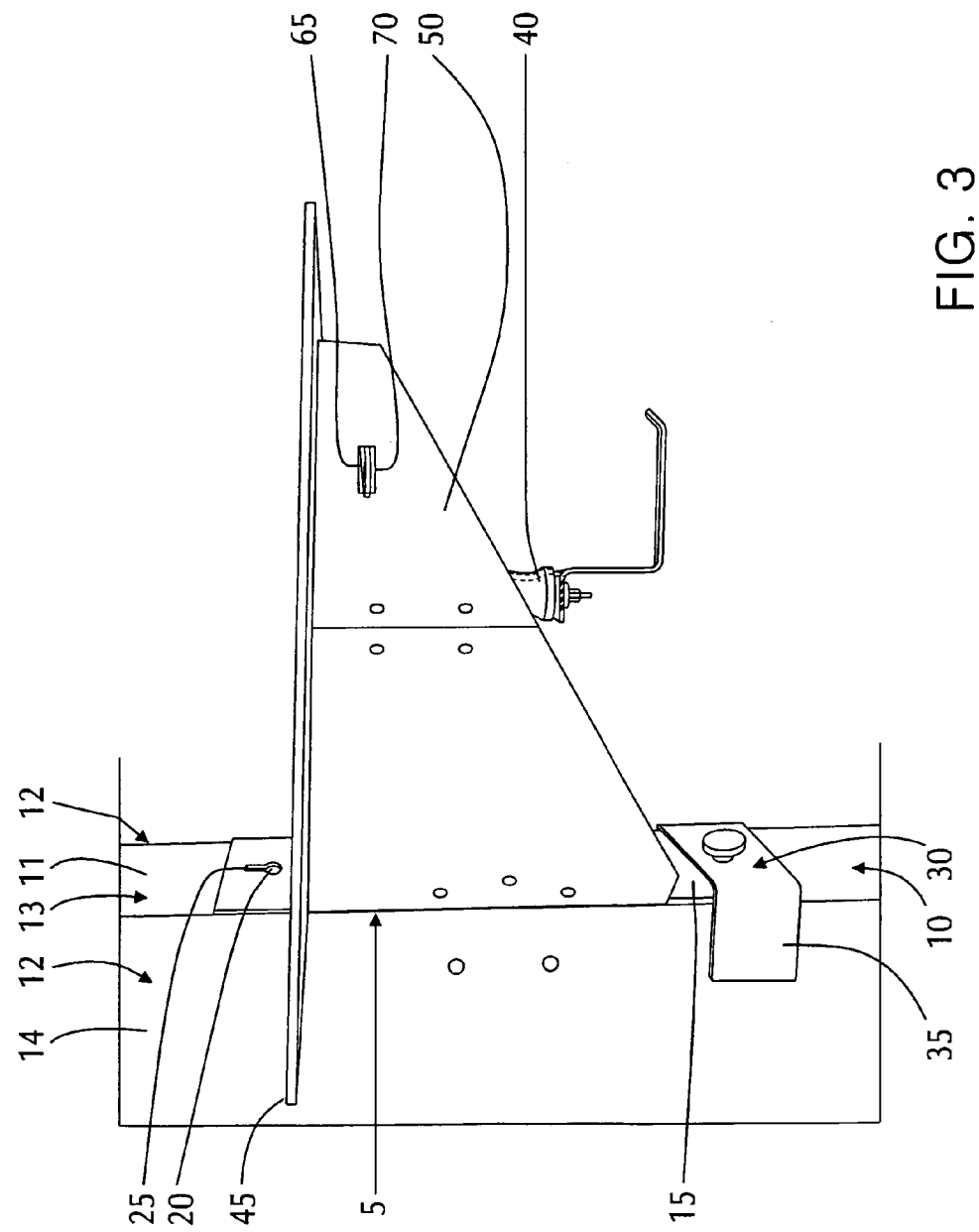
Figure 4:
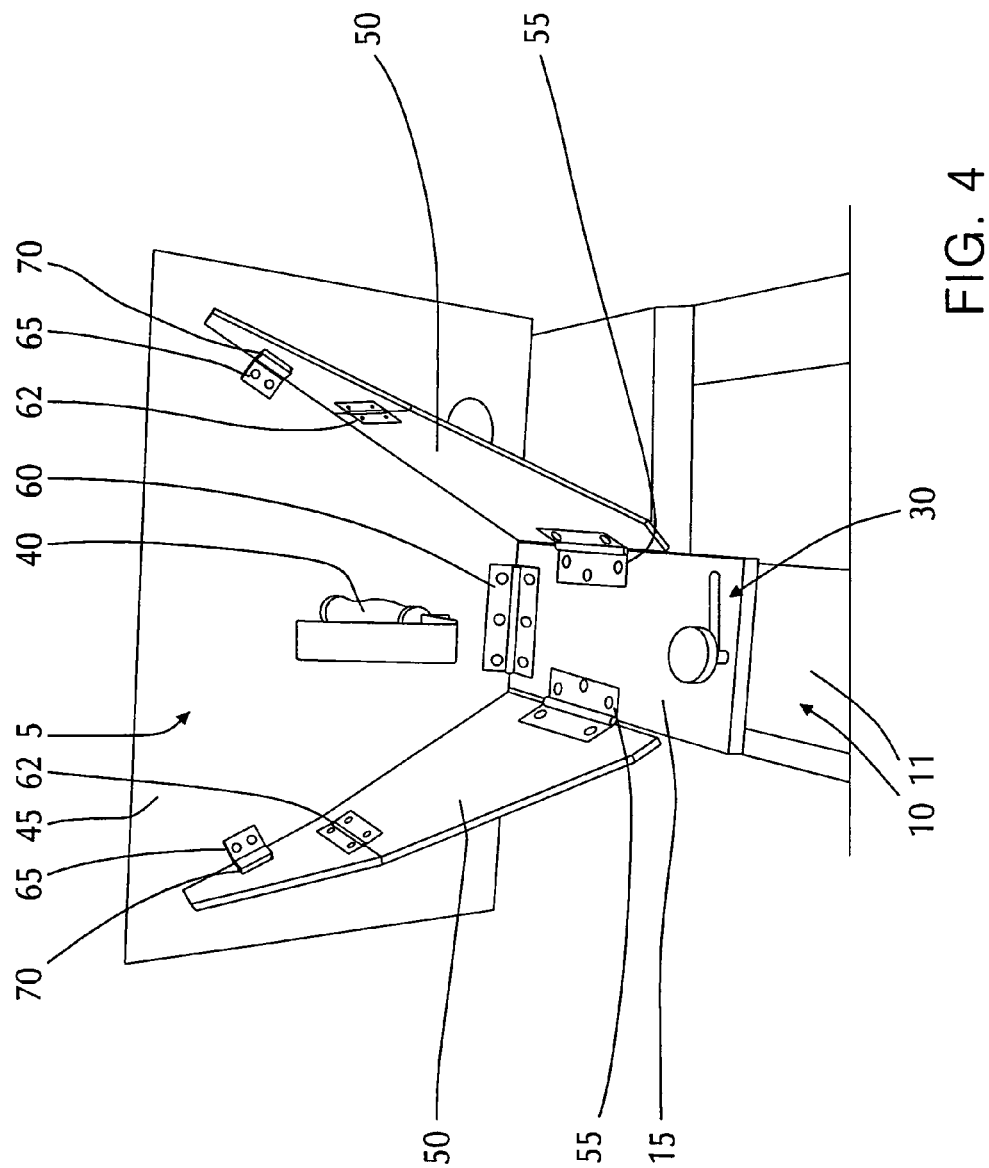
Figure 5:
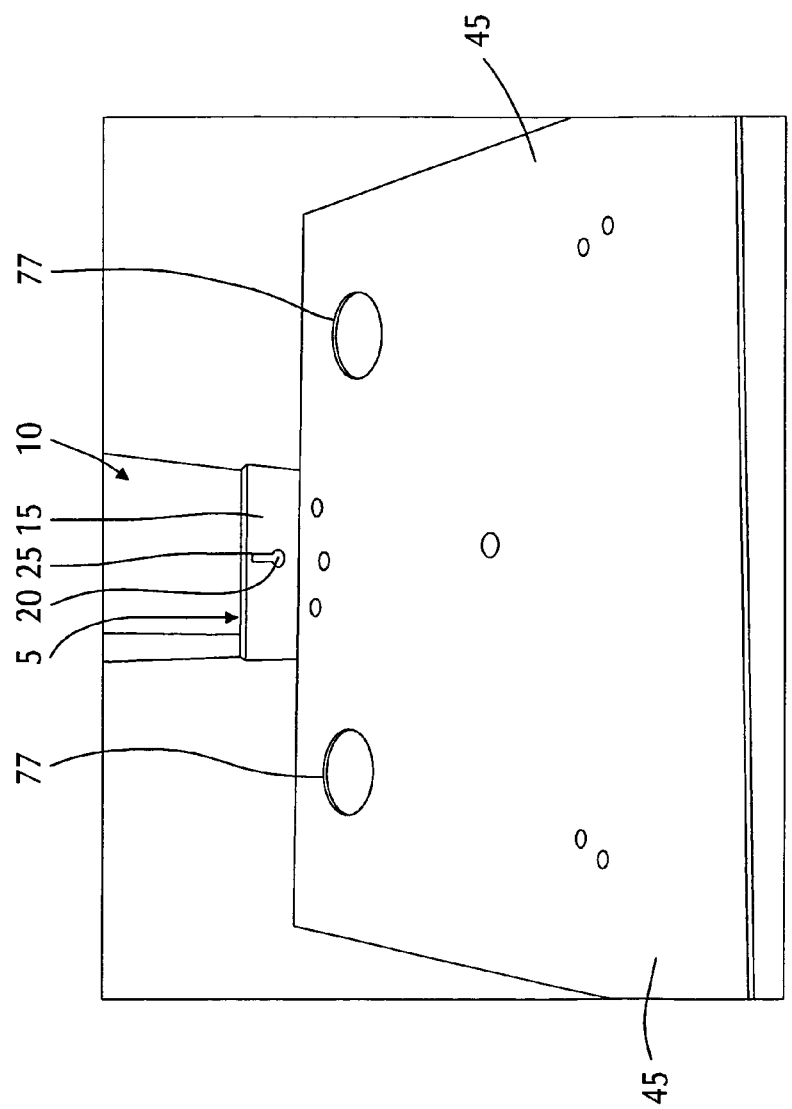
Figure 6:
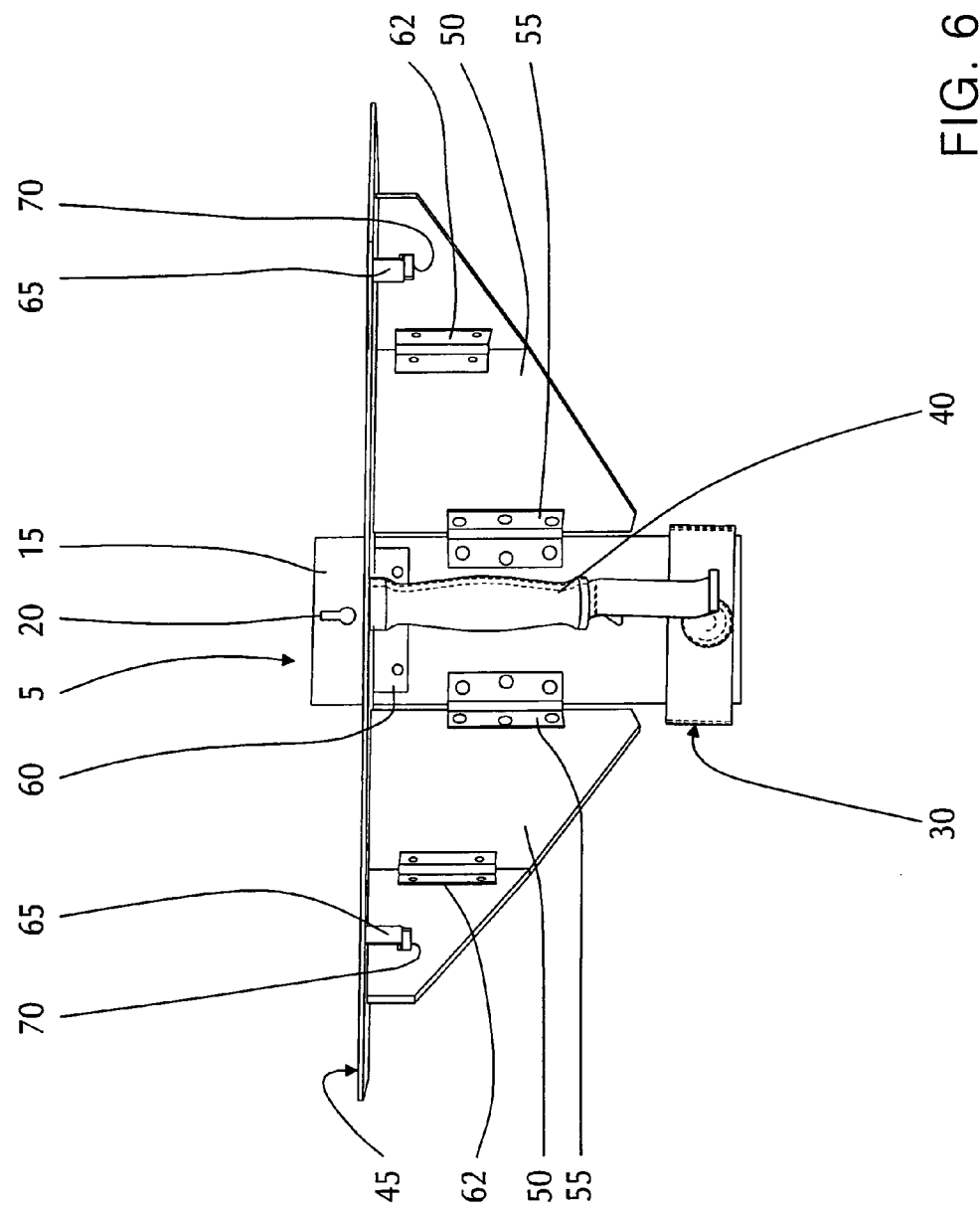
Figure 7:
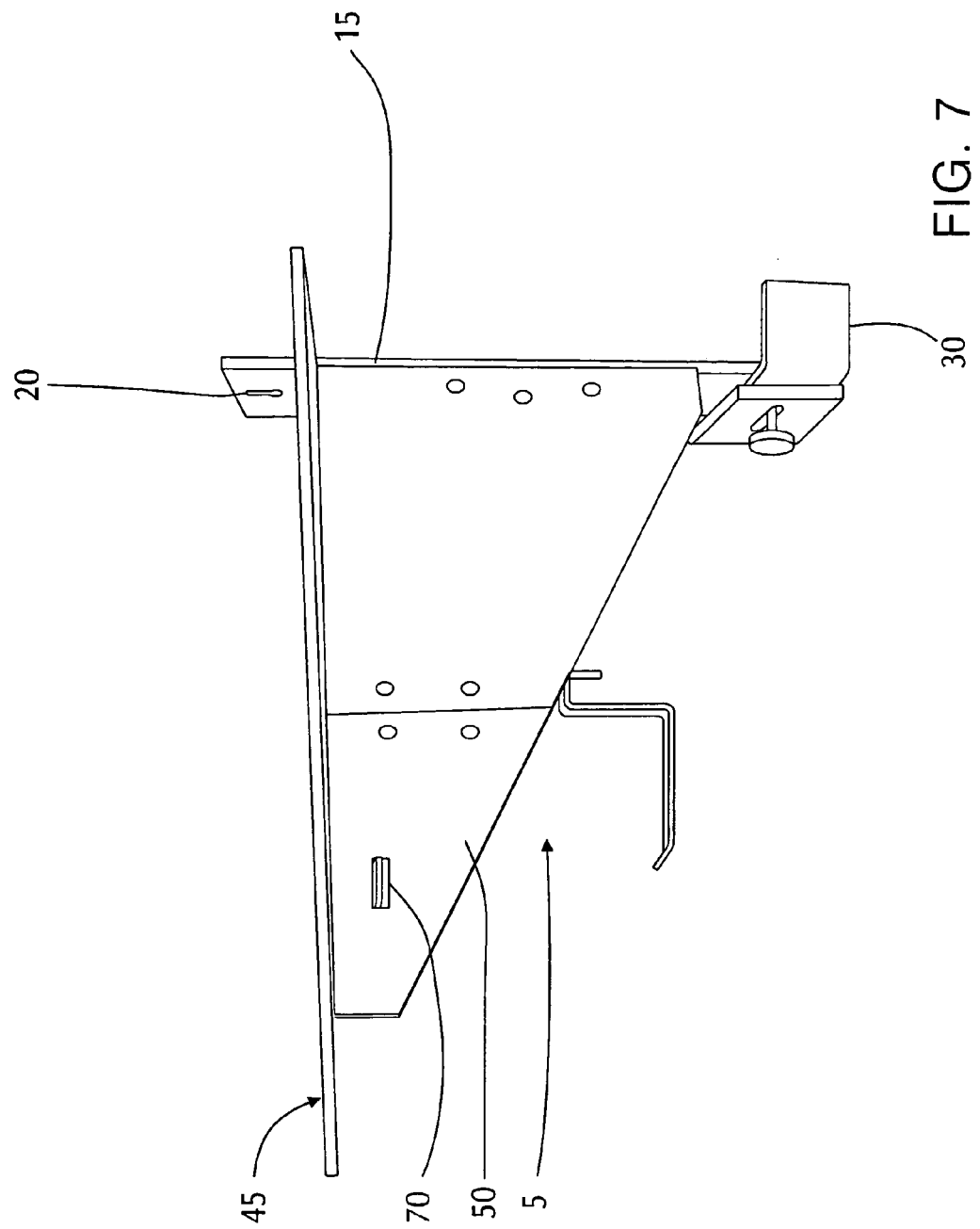
Figure 8:
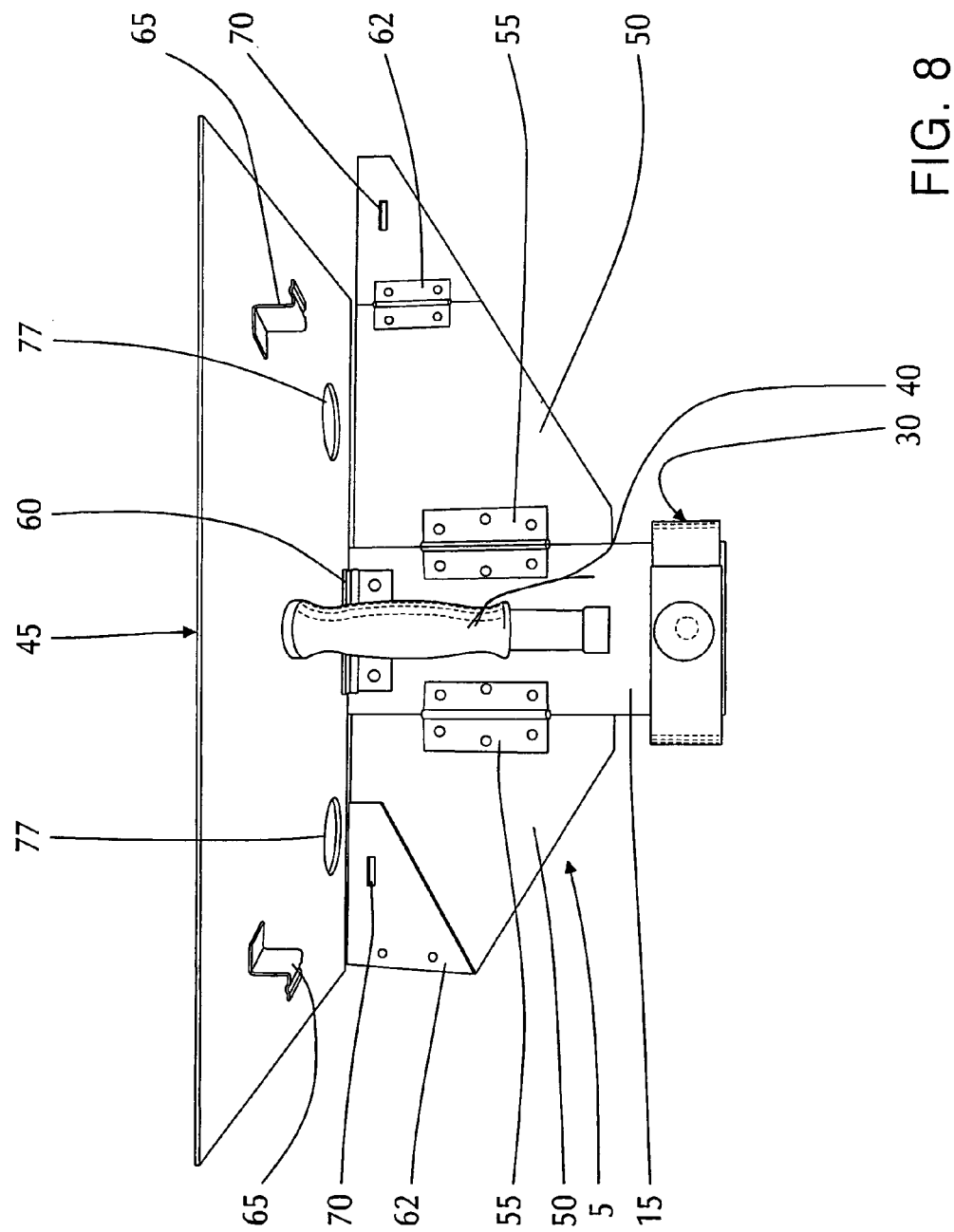

Referring now to FIGS. 2, 3, and 5, there is shown a vertical support member 15 configured with an opening 20 therethrough. Support member 15 is supported on door jamb 10 by a fastener device 25 driven into stud 13 to a depth of ¼". Opening 20 is preferably sized for placement over fastener device 25 so as to allow attachment to and removal from door jamb 10 without removing fastener device 25 from stud 13. Fastener device 25 includes, but is not limited to, a nail or a screw. Multiple fastener devices 25 may be positioned at various work areas throughout a job site to permit one-handed movement of tool support device 5 from area to area.

Referring to FIGS. 1-4, 6-18, 10, 11, 17, 19, 21, 22, 25, and 27, there is shown a wall grip mechanism 30 in attachment with vertical support member 15. Wall grip mechanism 30 preferably includes a pair of projections 35 extending away from and substantially orthogonal to vertical support member 15. Projections 35 are configured for placement on each of side portions 12 of door jamb 10. Wall grip mechanism 30 restricts movement of tool support device with vertical support member 15 hangs from fastener device 25. Preferably, projections 30 are adjustable with respect to one another various widths, and preferably to accommodate 2"×4" and 2"×6" walls.

Figure 15:
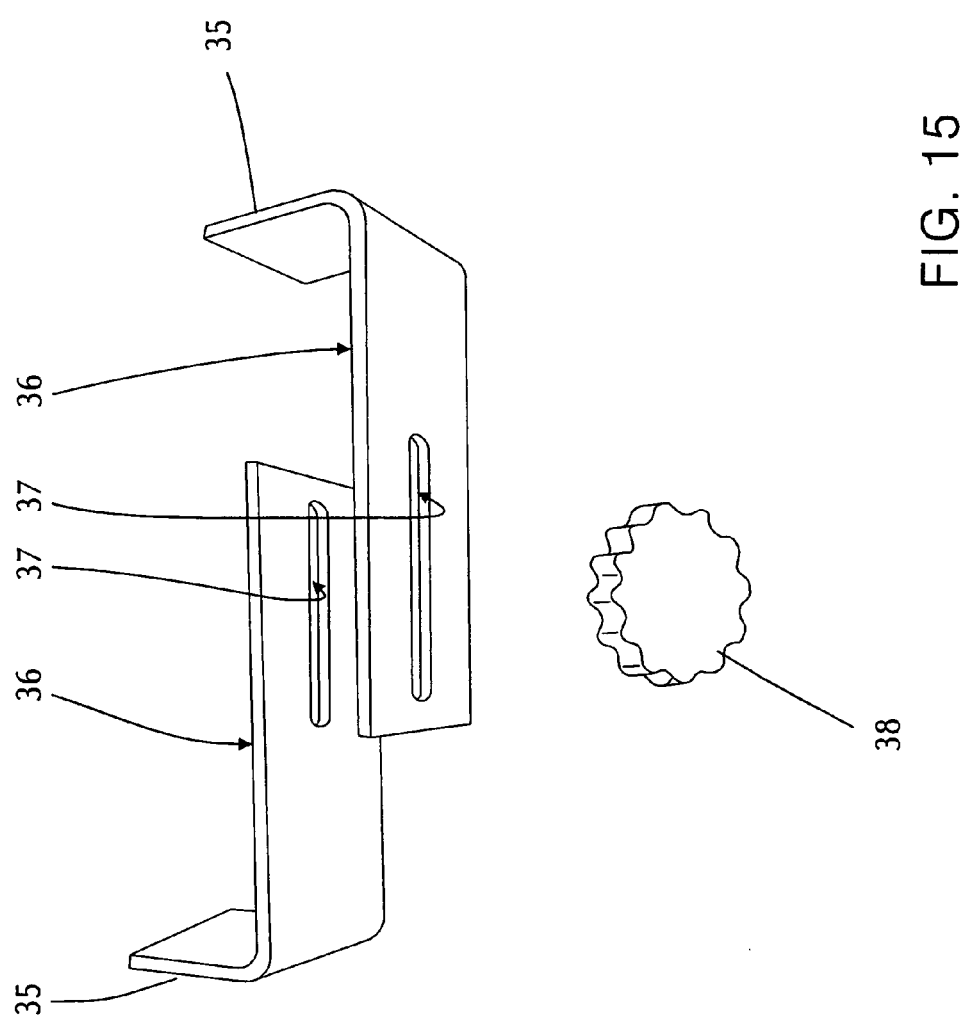
FIG. 15 is an illustration of brackets and knob components of a wall grip mechanism of the tool support device shown in FIGS. 1-14.

Referring now to FIG. 15, wall grip mechanism 30 preferably includes two brackets 36. Projection 35 is formed on one leg of bracket 36. A slot 37 is formed in the other leg of bracket 36. A knob 38 is configured for threadable engagement with a threaded protrusion 39 (FIG. 14) extending from vertical support member 15.

In an alternative preferred embodiment of the present invention (not shown), there is provided a wall grip mechanism with projections disposed apart a fixed width from one another.

Referring to FIGS. 1-8 and 10-14, tool support device 5 is preferably used by lowering vertical support member 15 into place with opening 20 disposed around fastener 25. Vertical support member 15 is positioned against face 11 of door jamb 10 and projections 35 of wall grip mechanism 30 are placed against side portions 12 of door jamb 10. If required, projections 35 are adjusted to fit door jamb 10.

Referring to FIGS. 1-4, 6, 8, and 12, there is shown a hand grip 40 located underneath a horizontal platform 45. Hand grip 40 threadably engages a threaded protrusion 48 (FIG. 14) extending from the bottom of horizontal platform 45. Hand grip 40 allows single-handed attachment of tool support device 5 to door jamb 10. This allows a worker on stilts to retain all tools and supplies while changing locations on a job site.

Tool support device 5 is preferably constructed from materials which include, but are not limited to, aluminum alloys and lightweight composite materials. Tool support device 5 is preferably constructed of tool grade aluminum alloy. Preferably, door jamb tool support device 5 supports at least 35 pounds on horizontal platform 45.

Referring again to FIGS. 2, 4, 6, 8, 10, and 14, and in a preferred embodiment of the present invention, there is shown a first set of hinges 55 attaching support arms 50 to vertical support member 15. A platform hinge 60 (FIG. 4) attaches horizontal platform 45 to vertical support member 15. An auxiliary hinge 62 is provided on each support arm 50 so as to allow each arm 50 to fold upon itself for compact storage.

Clips 65 are disposed on the lower surface of horizontal platform 45. Support arms 50 each contain an opening 70 which corresponds to one of clips 65 on support arms 50. Horizontal platform 45 is configured for use by securing each one of clips 65 through opening 70 of each one of support arms 50.

Horizontal platform 45 is configured for storage by first removing each one of clips 65 from opening 70 of each one of support arms 50, and then folding closing platform hinge 60 to bring horizontal platform 45 and vertical support member toward one another.

Figure 9:
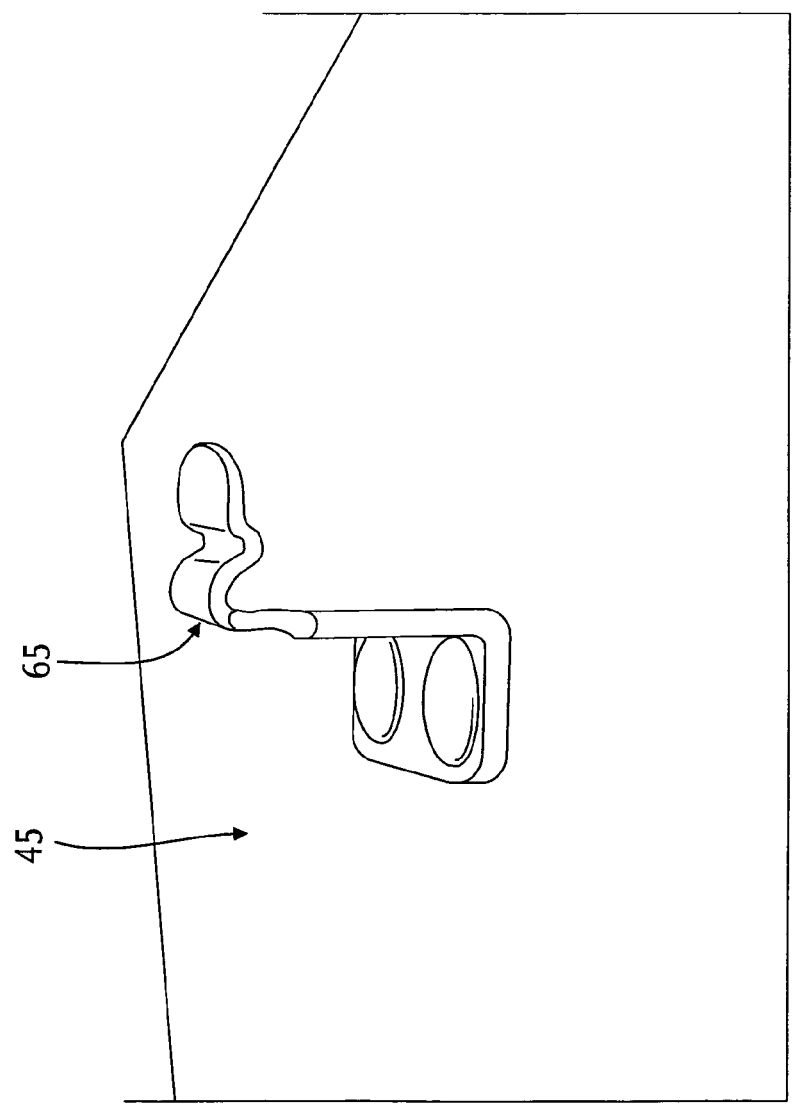
Figure 10:
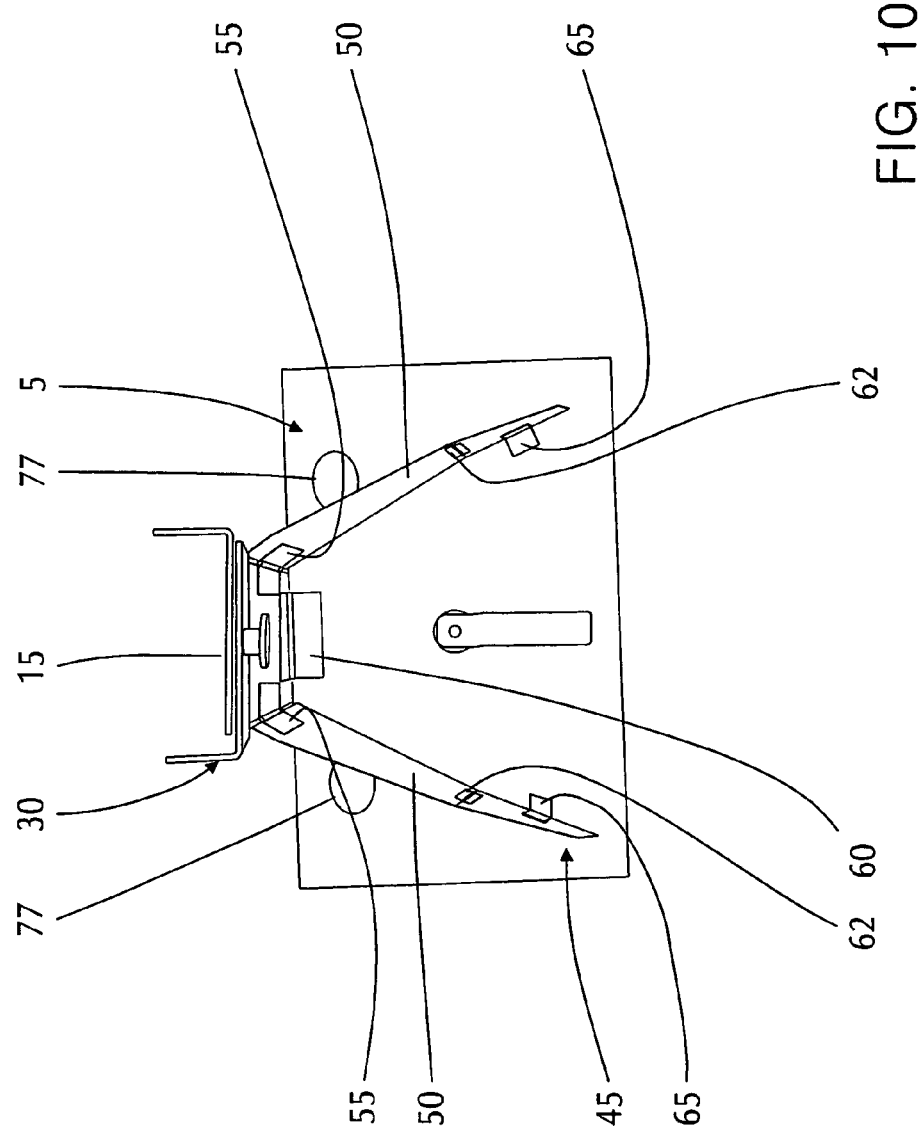
Figure 11:
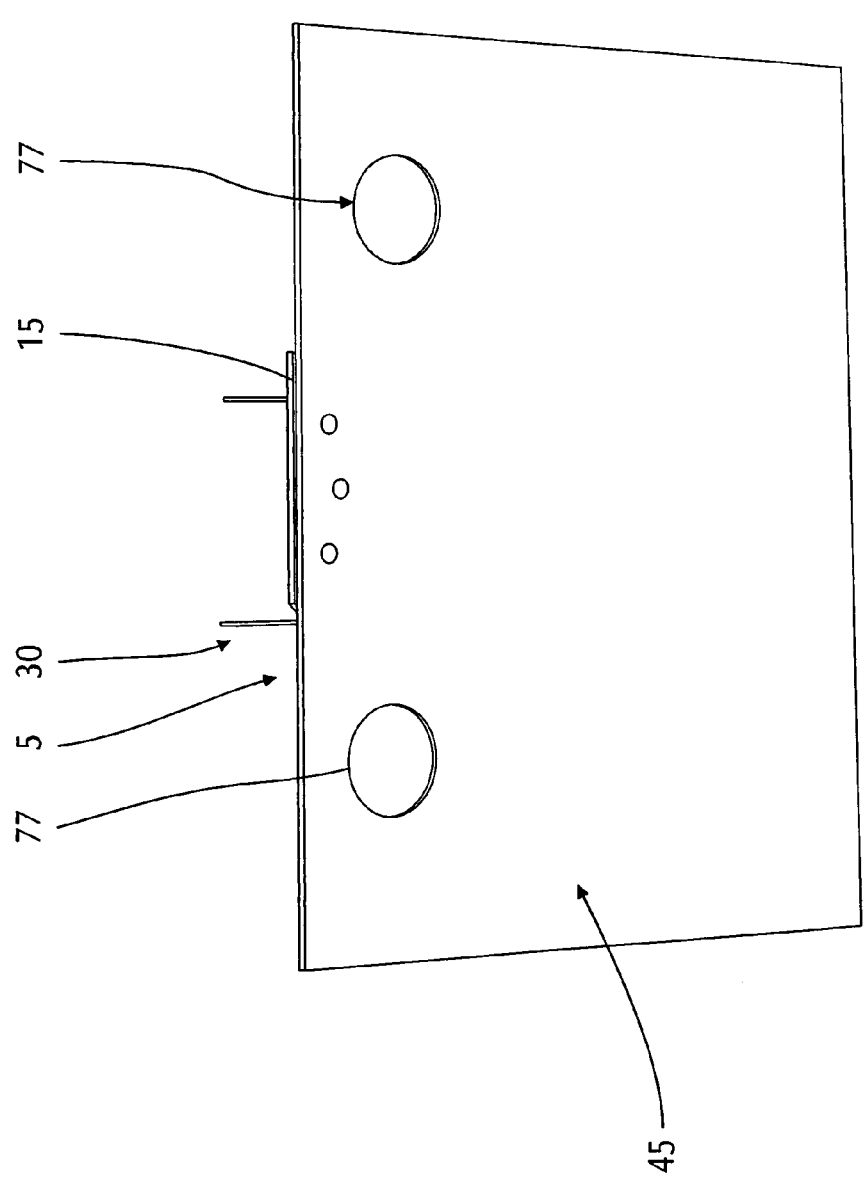

Referring to FIG. 9, there is shown a close-up view of clip 65 disposed on the surface of horizontal platform 45.

Figure 12:
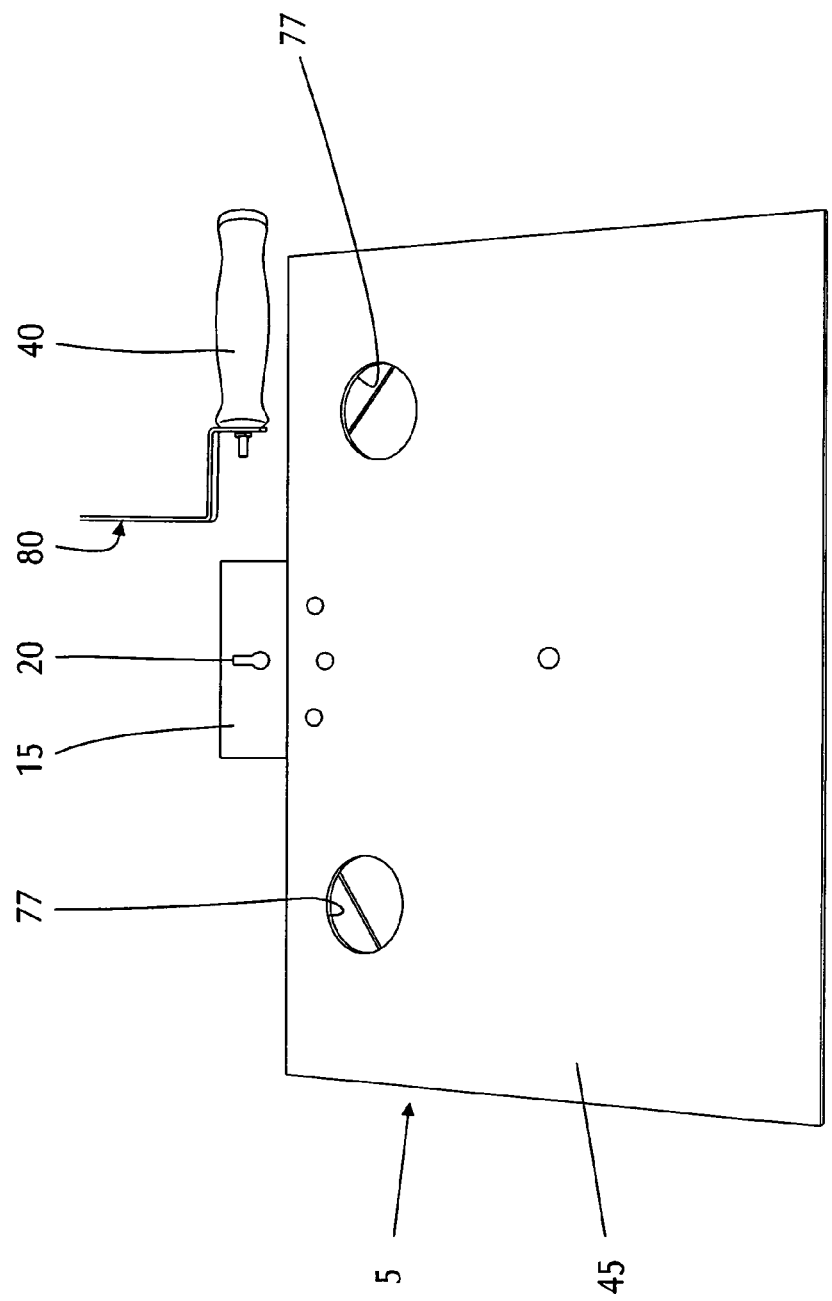
Figure 13:
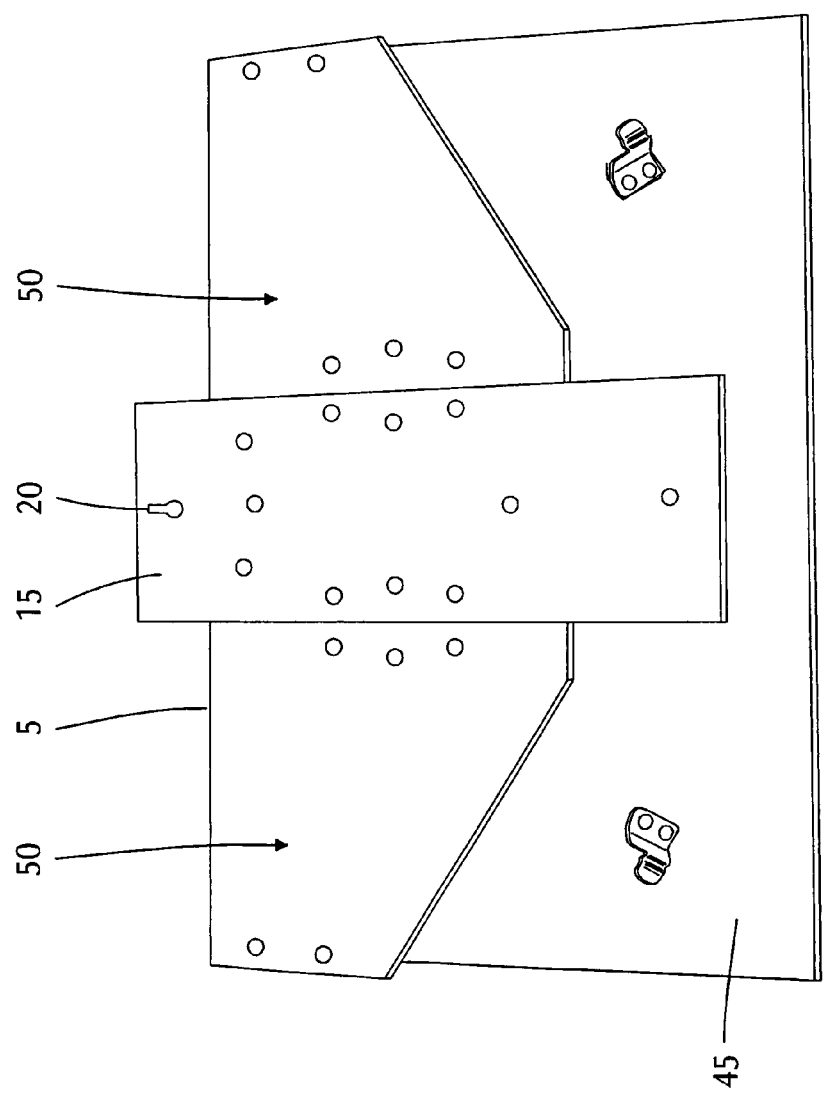
Figure 14:
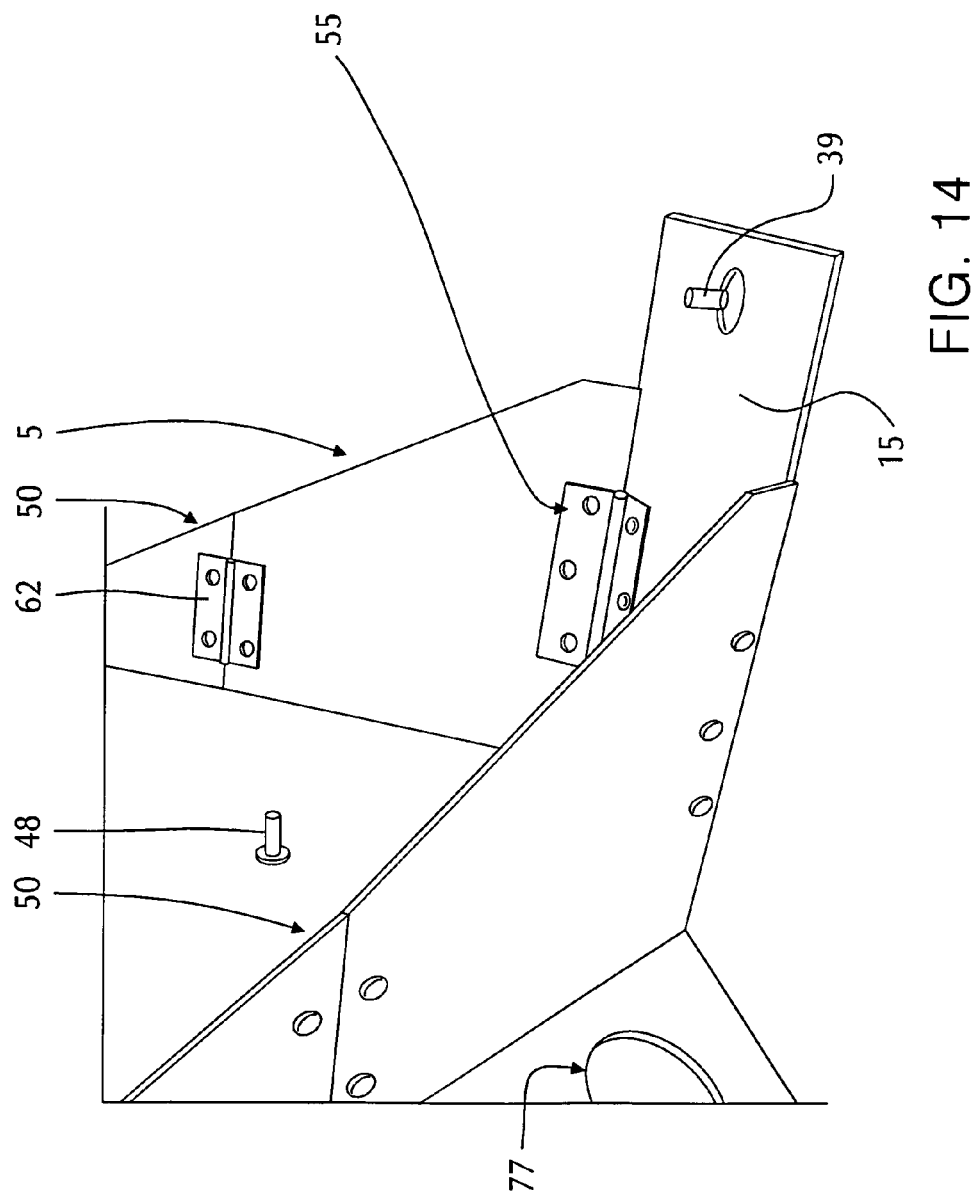

Looking now at FIGS. 12 and 13, there is shown horizontal platform 45 and vertical support member 15 in a folding configuration toward one another. This folding configuration allows easier storage of tool support device 5 in a tool box or vehicle.

Figure 17:
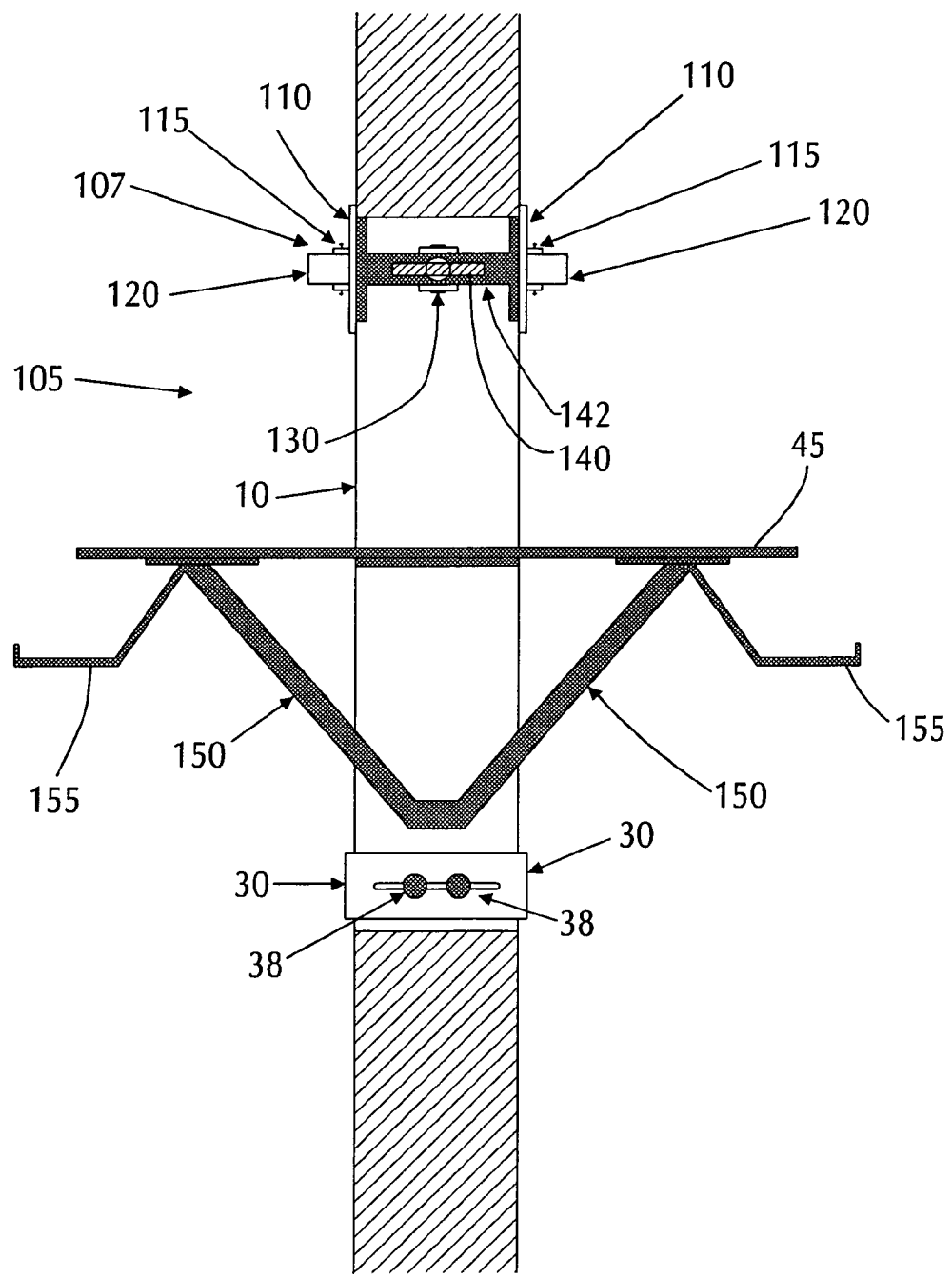
FIGS. 17 and 18 are schematic diagrams of another form of a tool support device having rigid support legs and an attachment clamp.

Referring now to FIG. 17, and in a preferred embodiment of the present invention, there is shown a fixed, non-folding tool support device 105 having rigid support arms 150. Rig support arms 150 are preferably configured to provide additional strength and/or decreased mass than folding support arms 50.

Several preferred embodiments of the present invention are provided as examples of features for various specific types of trade work.

Referring to FIGS. 1-14, tool support device 5 is shown configured for drywall installation with a flat platform 45 for mud pan placement. Platform 45 extends past both sides of door jamb 10 to allow access to horizontal platform 45 from adjoining work areas. Platform 45 contains holes 77 therethrough for easy access retention of taping knives 79. In a preferred embodiment of the present invention, door jamb platform 45 has ambidextrous holes therethrough for taping knife and screw driver retention, and includes ambidextrous drywall tape holders. This configuration of ambidextrous holders also allows workers to store and access tools on either side of the doorway. Preferably, holes are provided to allow screwdrivers, hammers and other tools to be secured.

A hook 80 is disposed beneath the underside of platform 45 and is preferably configured for securing rolls of joint tape 89 such that joint tape 89 is accessible from work areas on both sides 12 of door jamb 10.

Figure 16:
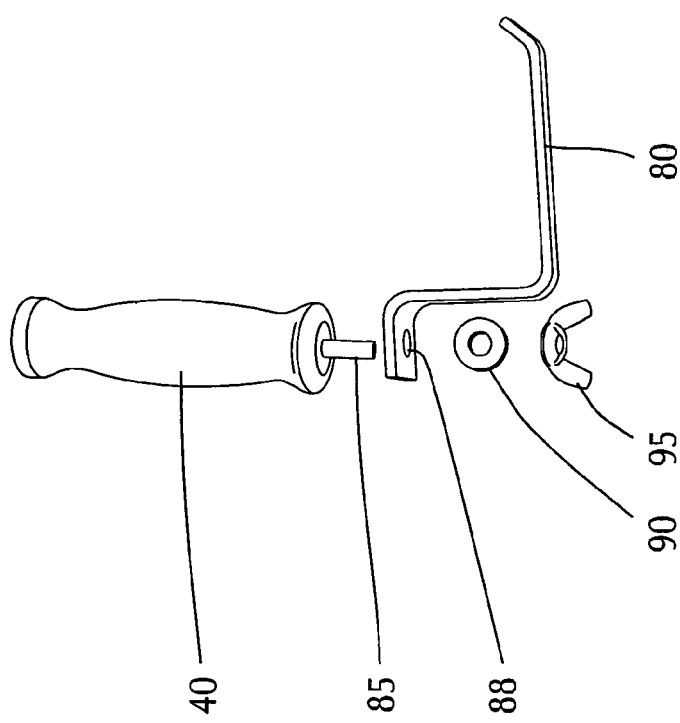
FIG. 16 is an illustration handle, hook and attachment components of the tool support device shown in FIGS. 1-14.

Referring to FIG. 16, hook 80 is preferably attached to platform 45 by a threaded projection 85 extending from handle 40 through hole 88 and secured by a washer 90 and wing nut 95.

Figure 18:
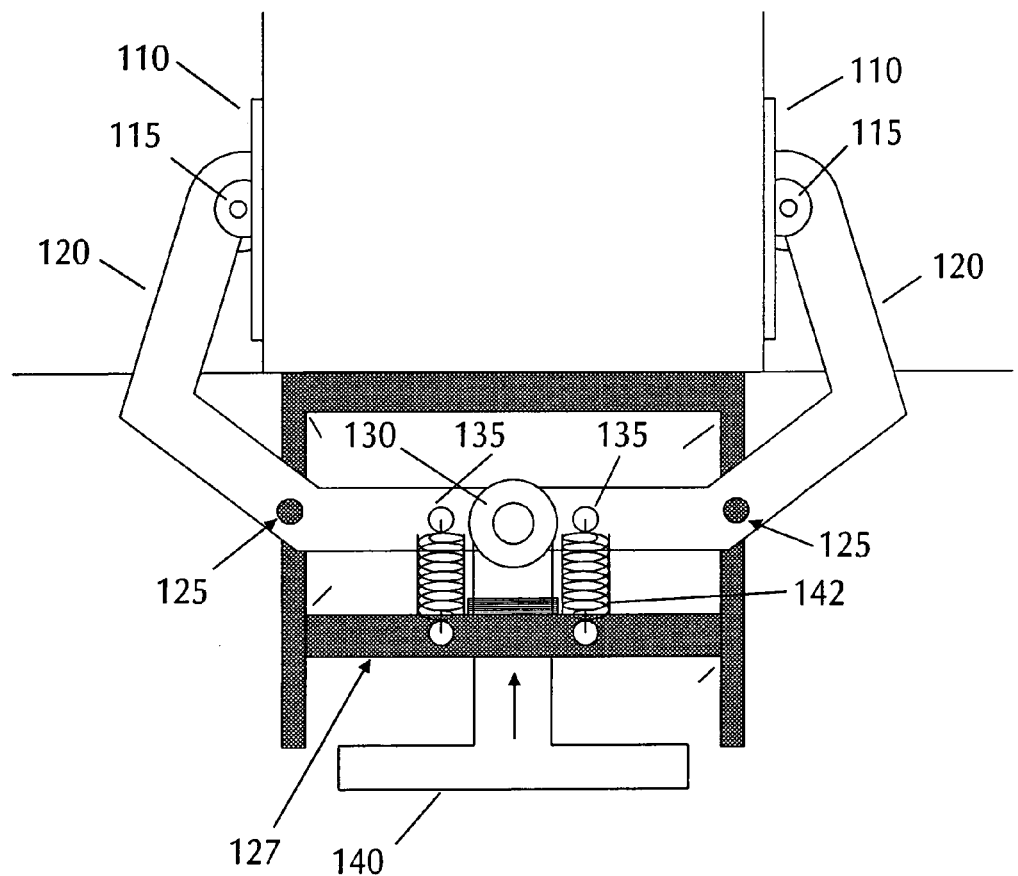

Referring now to FIGS. 17 and 18, and in another preferred embodiment of the present invention, there is shown a tool support device 105 having an attachment clamp 107. Attachment clamp 107 is configured for attaching tool support device 105 to door jamb 10, especially when door jamb 10 includes steel stud wall construction. A pair of grip pads 110 are adjustably positioned by attachment clamp 107 to secure tool support device 105 to door jamb 10. A swivel 115 connects each grip arm 120 to grip pads 110 and a pivot 125 connects each grip arm 120 to a vertical support member 127. A swivel joint 130 rotatably anchors grip arms 120 to one another. A pair of springs 135 provides a bias force between grip arms 120 and vertical support member 127 which urges grip pads 110 toward one another. A push handle 140 is connected to grip arms 120 to selectively overcome the bias force of the spring so as to urge grip pads 110 apart from one another. A collar 142 disposed around push handle 140 limits the distance that the spring bias force may urge the handle away from vertical support member 127 so as to prevent grip handles 110 from approaching one another.

Figure 19:
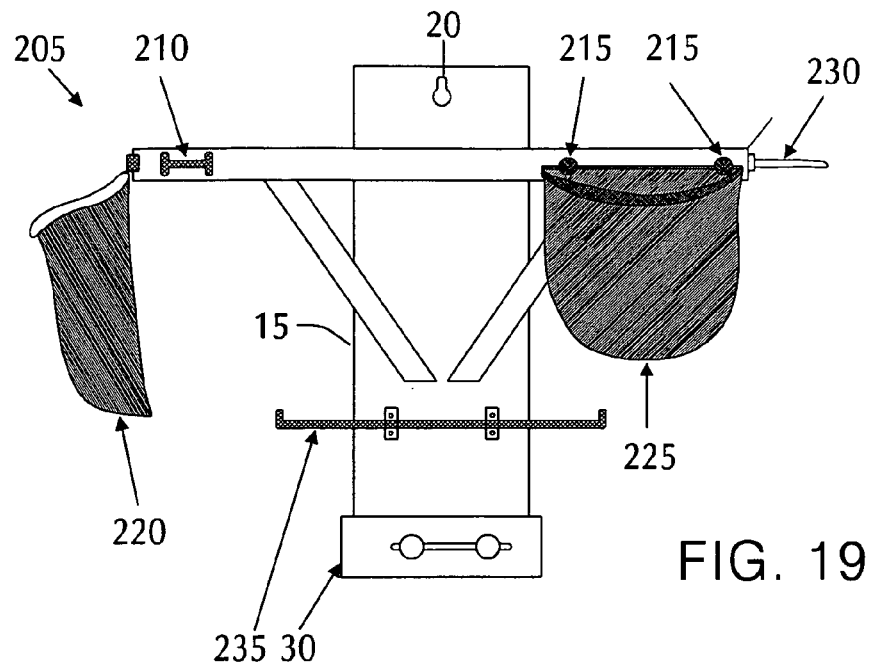
FIGS. 19 and 20 are schematic diagrams of another form of a tool support device having holders for carpenter tools.
Figure 20:
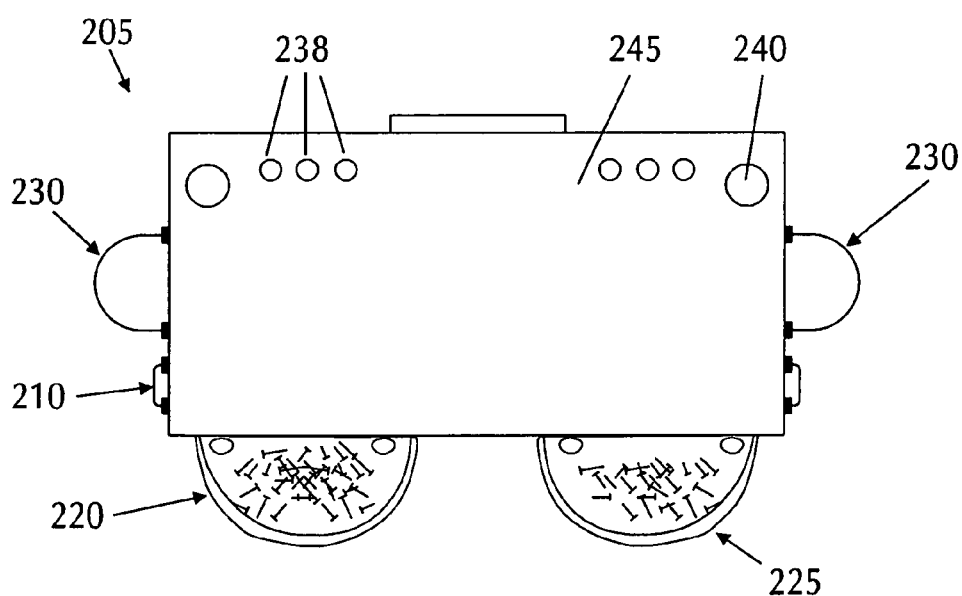

Referring to FIGS. 19 and 20, there is shown a carpenter tool support device 205, which is configured for use by suspended ceiling hanging workers, carpenters and drywall hanging workers using stilts for high ceilings. Carpenter tool support device 305 has a tray top 107 configured to retain various tools and fastening devices. The retaining mechanisms include, but are not limited to, a tape measure clip 210, snaps 215, detachable nail pouches 220, detachable fastener pouches 225, a hammer ring 230, a wire spool holder 235, screw driver holders 238, and a screw gun holder 240.

Figure 21:
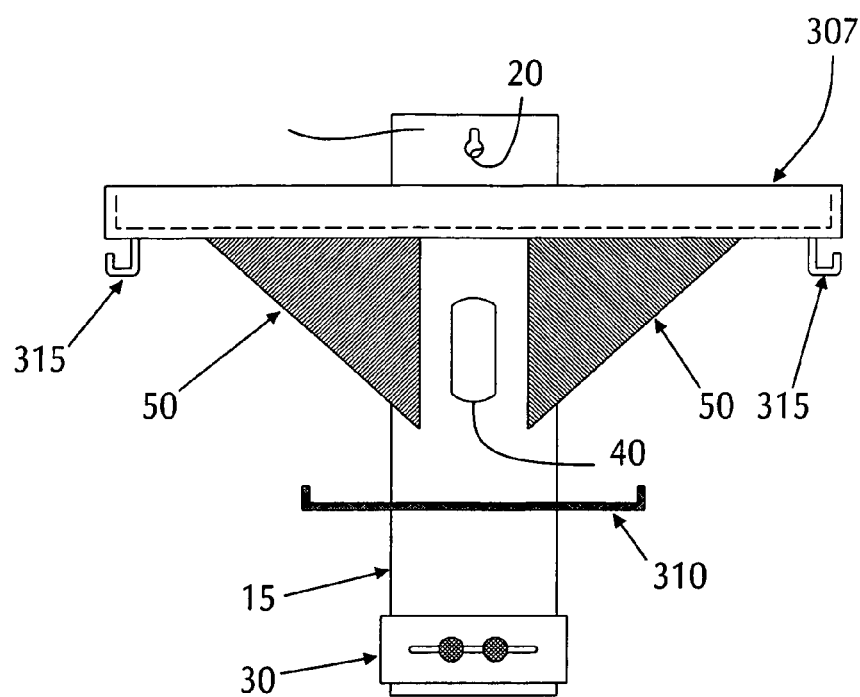
FIG. 21 is a schematic diagram of another form of a tool support device having holders for painter tools.

Referring now to FIG. 21, and in a preferred embodiment of the present invention, there is shown a painter tool support device 305 having a tray 307 having with edges bent upward to to prevent paint can spillage. Painter tool support device 305 is preferably configured with a holder 310 for masking tape. Hooks 315 are placed on the underside of tray 307 for hanging paint brushes, edging knives, and rags. Painter tool support device 305 is preferably configured to aid a painter on stilts doing corner edging.

Figures 22, 23:
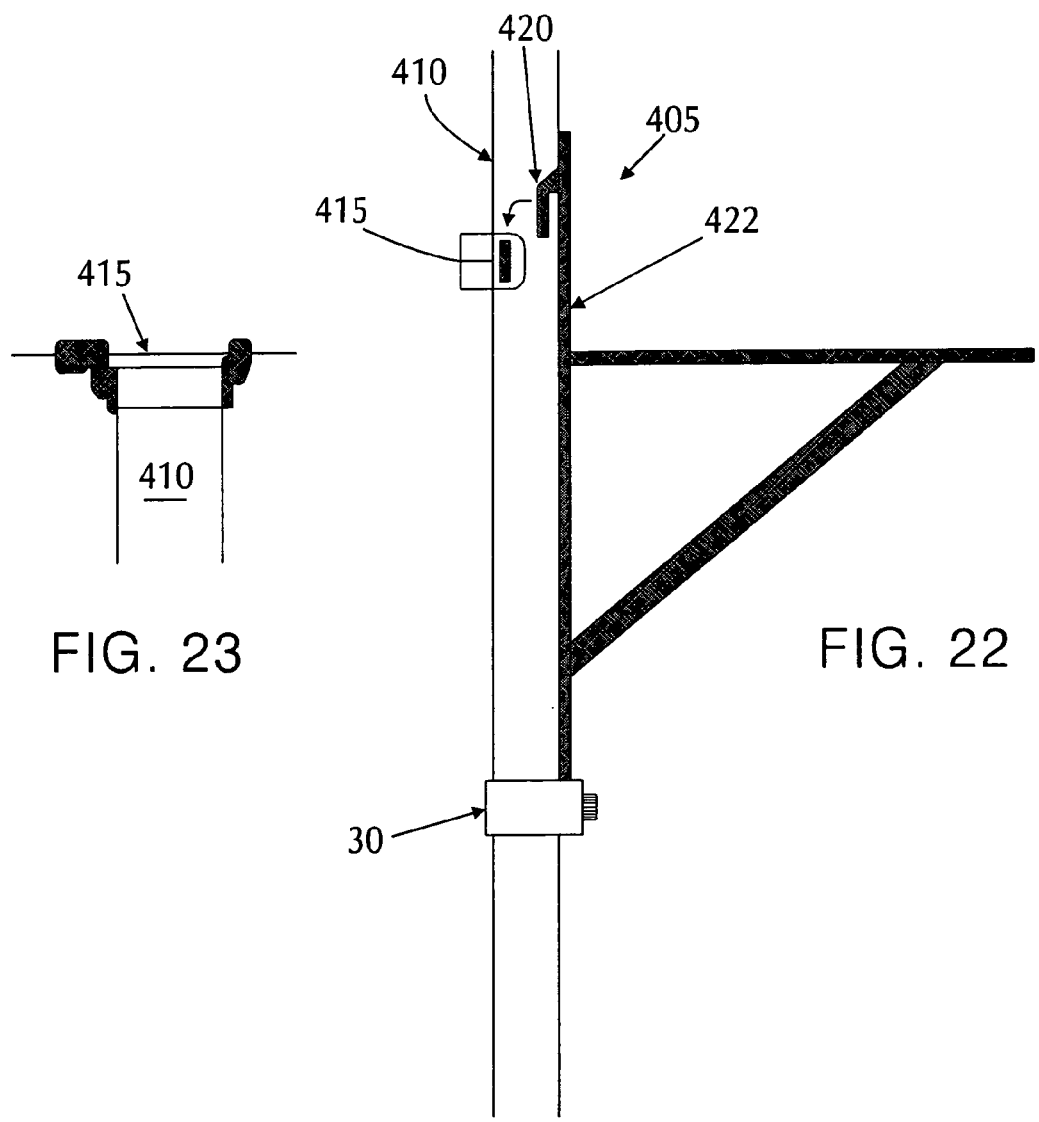
FIGS. 22 and 23 is a schematic diagram of another form of a tool support device specifically configured for attachment to a steel stud.

Referring to FIGS. 22 and 23, there is shown a tool support device 405 configured for attachment to a door jamb 410, such as a steel stud wall. A quick grip bar clamp 415 is attached to steel stud wall 410. A hook 420 extends from a vertical support member 422 of tool support device 405. Hook 420 is configured for attachment to clamp 415.

Figures 24A, 24B, 24C:
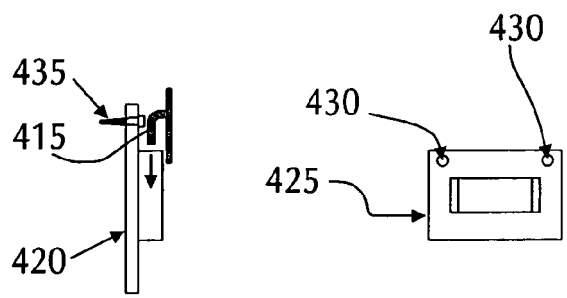
FIGS. 24A-24C are schematic views of an alternative fastener device configured for use with the tool support device shown in FIG. 22.

Referring now to FIGS. 24A-24C, there is shown a clip fastener device 425 having a pair of screw holes 430 configured for attachment to steel stud 410 of a metal frame using a pair of screws 435. Clip fastener device 425 is used in place of clamp 415 (FIG. 22) and contains a recess 440 configured to receive hook 420 therein.

Figure 25:
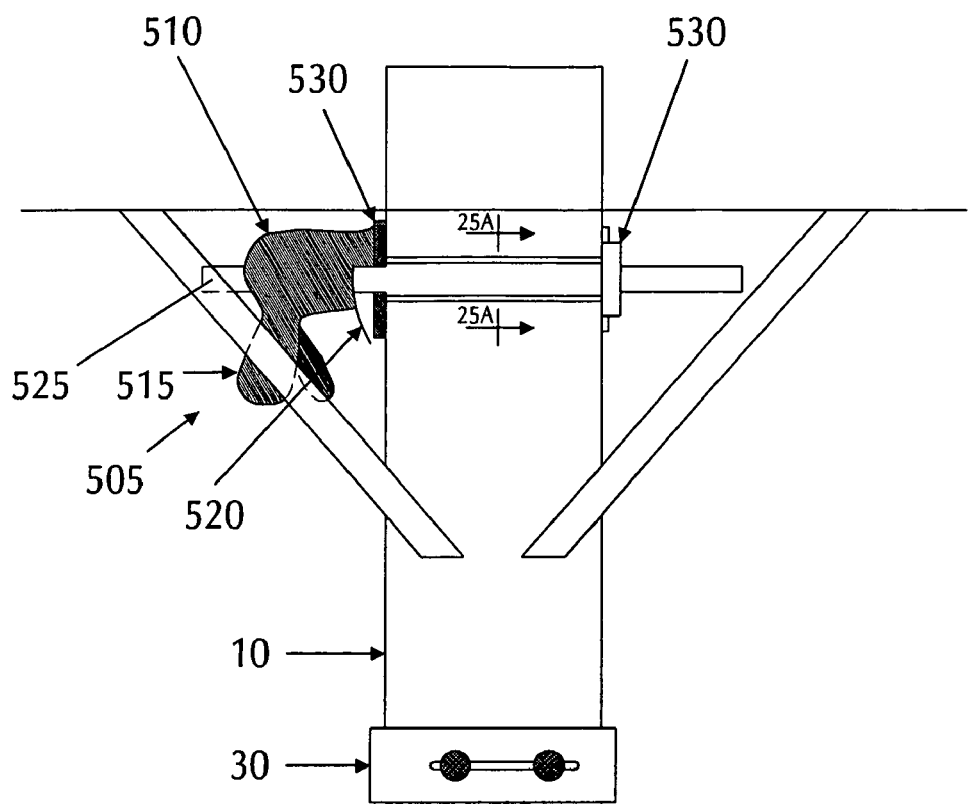
FIGS. 25 and 25A are schematic views of an alternative fastener device having a pistol grip clamp.
Figure 25A:
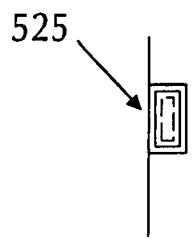

Looking now at FIGS. 25 and 25A, there is shown a tool support device 505 with a pistol grip clamp 510. A handle 515 and a trigger mechanism 520 of clamp 510 is configured to position a bar 525 so as to selectively open and close grip pads 530 for attachment to door jamb 10.

Figures 26, 27:
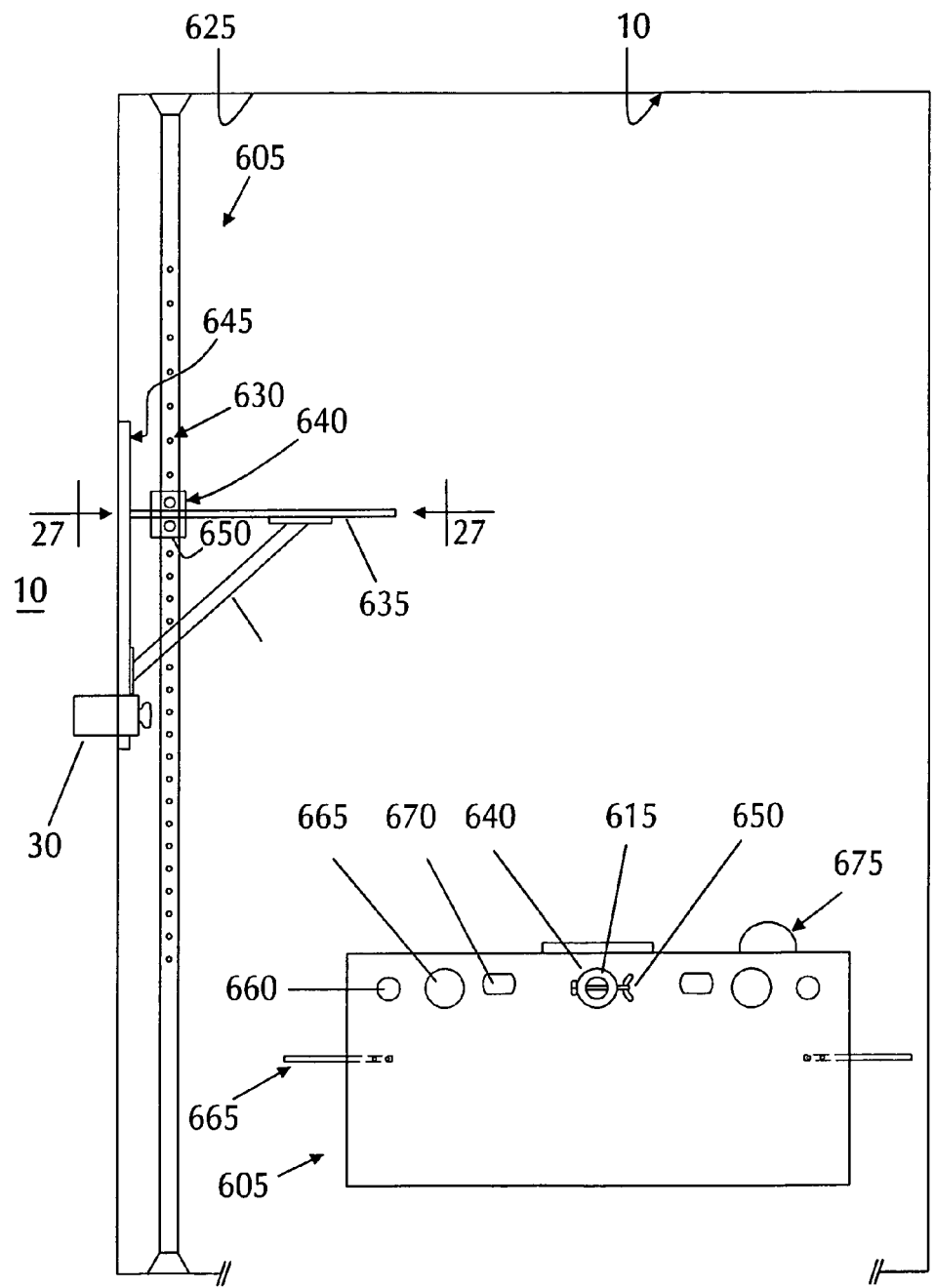
FIGS. 26 and 27 are schematic views of an alternative fastener device having a spring loaded rod configured for placement in a doorway.

Looking now at FIGS. 26 and 27, there is shown a tool support device 605 configured for placement in a door opening 610. A spring loaded rod 615 is provided having a length to extend from a floor portion 620 to a top portion 625 of door opening 610. Rod 615 contains a series of holes 630 extending a distance between floor portion 620 and top portion 625 of door opening 610. Holes 630 allow adjustment of the height of a horizontal platform 635. A collar 640 is in attachment to a vertical support member 645 and horizontal platform 635. An attachment member 650 selectively attaches collar 640 to spring rod 615 so as to allow vertical adjustment of platform 635. Attachment member 650 includes, but is not limited to, wing nut bolts, spring loaded push balls, and clevis pins.

Horizontal support member 635 of tool support device 605 preferably includes one or more tool holders. Referring to FIG. 27, these tool holders include a tape holder 655, a screw driver holder 660, a screw gun holder 665, a taping knife holder 670, and a hammer holder 675.

What is claimed is:

1. Apparatus for supporting tools at a given height on a door jamb, the apparatus comprising:
    a vertical support member having a top end and a bottom end, a front side and a back side, and forming a passageway through the back side thereof, the passageway configured to attach the vertical support member to a fastener device extending from the door jamb;
    a wall grip mechanism in connection with the vertical support member, the wall grip mechanism disposed below the passageway formed in the vertical support member, the wall grip mechanism comprising a first projection and a second projection disposed apart from one another at a first given width, and each one of the first projection and the second projection extending in a first direction away from the vertical support member, the first direction parallel to a first axis extending from the front side to the back side of the vertical support member; and
    a tool platform extending in a second direction away from the vertical support member, the second direction parallel to a second axis extending from the back side to the front side of the vertical support member, the second direction substantially opposite to the first direction, the tool platform having a front end and a back end in opposition to one another, and the tool platform forming a horizontal surface between the front end and the back end;
    wherein the passageway of the vertical support member is positioned around the fastener device extending from a vertical face of the door jamb, the first projection of the wall grip mechanism is positioned on a first side of the door jamb and the second projection of the wall grip mechanism is positioned on a second side of the door jamb so as to fixedly position the tool platform to the door jamb at the given height.

2. Apparatus according to claim 1 wherein the passageway is disposed adjacent the top end of the vertical support member.

3. Apparatus according to claim 1 wherein the passageway extends from the back side through to the front side of the vertical support member.

4. Apparatus according to claim 1 wherein the first given width between the first projection and the second projection is a fixed distance apart.

5. Apparatus according to claim 4 wherein the fixed distance between the first projection and the second projection is configured to secure the wall grip mechanism to a standard sized stud forming the door jamb.

6. Apparatus according to claim 5 wherein the fixed distance between the first projection and the second projection is configured to secure the wall grip mechanism to the standard sized stud with at least one sheet of wall board attached thereto.

7. Apparatus according to claim 4 wherein the fixed distance between the first projection and the second projection is configured to secure the wall grip mechanism to an oversized stud forming the wall grip mechanism.

8. Apparatus according to claim 4 wherein the fixed distance between the first projection and the second projection is configured to secure the wall grip mechanism to the oversized stud with at least one sheet of wall board attached thereto.

9. Apparatus according to claim 1 wherein the wall grip mechanism is selectively adjustable to position the first projection and the second projection from a first given width to a second given width.

10. Apparatus according to claim 9 wherein the first given width is configured to secure the wall grip mechanism to a standard sized stud forming the door jamb, and further wherein the second given width is configured to secure the wall grip mechanism to an oversized stud forming a door jamb, the second given width being wider than the first given width.

11. Apparatus according to claim 1 wherein the tool platform defines a longitudinal axis extending between the front end and the back end thereof, the tool platform defines a lateral axis extending orthogonally to the longitudinal axis, and the lateral axis defines a given width between a first side and a second side of the tool platform, and the given width of the tool platform configured wider than the vertical face of the doorjamb so as to extend the tool platform beyond the first side and the second side of the door jamb.

12. Apparatus according to claim 1 wherein the tool platform contains openings therethrough, and further wherein the openings are configured to hold tools therein.

13. Apparatus according to claim 1 wherein the tool platform comprises at least one hook.

14. Apparatus according to claim 13 wherein the at least one hook is configured to support therefrom at least one selected from a group consisting of a roll of joint tape, a roll of masking tape, a paint brush, an edging knife, and a rag.

15. Apparatus according to claim 1 further comprising a handle in connection with the vertical support member, the handle configured to allow one handed attachment and detachment of the vertical support member to the fastener device.

16. Apparatus according to claim 1 wherein the tool platform comprises edges bent upward to form a tray to prevent paint can spillage.

17. Apparatus according to claim 1 wherein the tool platform comprises at least one selected from a group consisting of a hammer ring, a detachable pouch, a screw gun holder, a tape measure clip, and a wire spool holder.

18. Apparatus according to claim 1 further comprising at least two support arms extending between the tool platform and the vertical support member.

19. Apparatus according to claim 18 wherein the at least two support arms are configured in a fixed position to secure the tool platform and the vertical support member to one another.

20. Apparatus according to claim 18 wherein the at least two support arms are selectively adjustable between a first position and a second position, the first position configured to dispose the tool platform and the vertical support member substantially orthogonal to one another, and the second position configured to dispose the tool platform and the vertical support member substantially parallel with one another.

21. Apparatus according to claim 1 wherein the fastening device comprises a screw.

22. Apparatus according to claim 1 wherein the fastening device comprises a nail.

23. A system for supporting tools at a given height in a door jamb, the system comprising:
  a fastening device having a given length and a given width, the fastening device configured to attach to a face of the door jamb;
  a vertical support member having a top end and a bottom end, a front side and a back side, and forming a passageway through the back side thereof, the passageway configured to attach the vertical support member to fastening device attached to the face of the door jamb; and
  a wall grip mechanism in connection with the vertical support member, the wall grip mechanism disposed below the passageway formed in the vertical support member, the wall grip mechanism comprising a first projection and a second projection disposed apart from one another at a first given width, and each one of the first projection and the second projection extending in a first direction away from the vertical support member, the first direction parallel to a first axis extending from the front side to the back side of the vertical support member; and
  a tool platform extending in a second direction away from the vertical support member, the second direction parallel to a second axis extending from the back side to the front side of the vertical support member, the second direction substantially opposite to the first direction, the tool platform having a front end and a back end in opposition to one another, and the tool platform forming a horizontal surface between the front end and the back end;
  wherein the passageway of the vertical support member is positioned around the fastening device extending from a vertical face of the door jamb, the first projection of the wall grip mechanism is positioned on a first side of the door jamb and the second projection of the wall grip mechanism is positioned on a second side of the door jamb so as to fixedly position the tool platform in the door jamb at the given height.

24. A system according to claim 23 wherein the fastening device comprises a screw.

25. A system according to claim 23 wherein the fastening device comprises a nail.

26. A method for supporting tools at a given height in a door jamb, the method comprising:
  providing apparatus for supporting tools at a given height in a door jamb, the apparatus comprising:
    a vertical support member having a top end and a bottom end, a front side and a back side, and forming a passageway through the back side thereof, the passageway configured to attach the vertical support member to a fastener device extending from the door jamb; and
    a wall grip mechanism in connection with the vertical support member, the wall grip mechanism disposed below the passageway formed in the vertical support member, the wall grip mechanism comprising a first projection and a second projection disposed apart from one another at a first given width, and each one of the first projection and the second projection extending in a first direction away from the vertical support member, the first direction parallel to a first axis extending from the front side to the back side of the vertical support member; and
    a tool platform extending in a second direction away from the vertical support member, the second direction parallel to a second axis extending from the back side to the front side of the vertical support member, the second direction substantially opposite to the first direction, the tool platform having a front end and a back end in opposition to one another, and the tool platform forming a horizontal surface between the front end and the back end;
  positioning the passageway of the vertical support member around the fastener device extending from the door jamb;

positioning the first projection of the wall grip mechanism against a first side of the door jamb and the second projection of the wall grip mechanism against a second side of the door jamb so as to fixedly position the tool platform to the door jamb at the given height.

27. A method according to claim 26 further comprising the step of adjusting the first projection toward the second projection prior to the step of positioning the first projection against the first side of the door jamb and the second projection against the second side of the door jamb.

28. A method according to claim 27 further comprising the step of adjusting the second projection toward the first projection prior to positioning the second buttress against the second side of the door jamb.

29. A method according to claim 26 further comprising the step of attaching the fastener device to the door jamb prior to the step of positioning the passageway of the vertical support member around the fastener device extending from the door jamb.

30. A method according to claim 26 wherein the fastening device comprises a screw.

31. A method according to claim 26 wherein the fastening device comprises a nail.

* * * * *